(12) United States Patent
Dinerstein et al.

(10) Patent No.: US 10,404,744 B2
(45) Date of Patent: Sep. 3, 2019

(54) DATABASE QUERY INJECTION DETECTION AND PREVENTION

(71) Applicant: Microsoft Technology Licensing, LLC, Redmond, WA (US)

(72) Inventors: Yosef Dinerstein, Haifa (IL); Oren Yossef, Haifa (IL); Tomer Weisberg, Haifa (IL); Assaf Akrabi, Haifa (IL); Tomer Rotstein, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 438 days.

(21) Appl. No.: 15/270,214

(22) Filed: Sep. 20, 2016

(65) Prior Publication Data

US 2018/0084007 A1    Mar. 22, 2018

(51) Int. Cl.

| G06F 17/30 | (2006.01) |
|---|---|
| H04L 29/06 | (2006.01) |
| G06F 16/2455 | (2019.01) |
| G06F 21/55 | (2013.01) |
| G06F 21/62 | (2013.01) |
| G06F 21/64 | (2013.01) |
| G06F 16/24 | (2019.01) |
| G06F 16/23 | (2019.01) |

(52) U.S. Cl.
CPC .... *H04L 63/1466* (2013.01); *G06F 16/24564* (2019.01); *G06F 21/554* (2013.01); *G06F 21/6227* (2013.01); *G06F 21/64* (2013.01); *G06F 16/23* (2019.01); *G06F 16/24* (2019.01)

(58) Field of Classification Search
CPC ................................................ G06F 16/24564
See application file for complete search history.

(56) References Cited

U.S. PATENT DOCUMENTS

| 7,444,331 | B1 | 10/2008 | Nachenberg et al. |
|---|---|---|---|
| 8,051,486 | B2 | 11/2011 | Beresniewicz |
| 8,225,402 | B1 | 7/2012 | Averbuch et al. |
| 2006/0212438 | A1 | 9/2006 | Ng |

(Continued)

FOREIGN PATENT DOCUMENTS

CN    102833270 A  *  12/2012

OTHER PUBLICATIONS

Dessiatnikoff, et al., "A Clustering Approach for Web Vulnerabilities Detection", In Proceedings of the IEEE 17th Pacific Rim International Symposium Dependable Computing, Dec. 12, 2011, pp. 194-203.

(Continued)

*Primary Examiner* — Syed H Hasan
(74) *Attorney, Agent, or Firm* — Liang IP, PLLC

(57) ABSTRACT

Computer systems, devices, and associated methods of detecting and/or preventing injection attacks in databases are disclosed herein. In one embodiment, a method includes determining whether parsing a database statement received from an application on the application server cause a syntax error in a database. In response to determining that parsing the received database statement does not cause a syntax error, determining whether an identical syntactic pattern already exists. In response to determining that an identical syntactic pattern already exists in the database, the method includes indicating that the received database statement does not involve an injection attack.

20 Claims, 8 Drawing Sheets

(56) References Cited

U.S. PATENT DOCUMENTS

| | | | | |
|---|---|---|---|---|
| 2008/0295081 | A1* | 11/2008 | Albot | G06F 11/3688 |
| | | | | 717/128 |
| 2012/0117644 | A1 | 5/2012 | Soeder | |
| 2012/0124661 | A1* | 5/2012 | Lee | G06F 21/554 |
| | | | | 726/13 |
| 2012/0284237 | A1* | 11/2012 | Li | G06F 16/24526 |
| | | | | 707/687 |
| 2014/0317738 | A1* | 10/2014 | Be'ery | H04L 63/14 |
| | | | | 726/23 |
| 2015/0205951 | A1 | 7/2015 | Anand et al. | |

OTHER PUBLICATIONS

Gomaa, et al., "Survey on Securing a Querying Process by Blocking SQL Injection", In Proceedings of the IEEE Third World Conference on Complex Systems, Nov. 23, 2015, 7 Pages.

Halfond, et al., "A Classification of SQL Injection Attacks and Countermeasures", In Proceedings of the IEEE International Symposium on Secure Software Engineering, vol. 1, Mar. 2006, 11 Pages.

"International Search Report and Written Opinion Issued in PCT Application No. PCT/US2017/051241", dated: Nov. 3, 2017, 12 Pages.

Singh, et al., "Detection and Prevention of SQL Injection Attacks Using Novel Method in Web Applications", In International Journal of Advanced Engineering Technology, vol. 6, Issue 4, Oct. 2015, 5 pages.

Roy, et al., "Detecting and Defeating SQL Injection Attacks", In International Journal of Information and Electronics Engineering, vol. 1, No. 1, Jul. 2011, pp. 38-46.

Alattar, et al., "Efficient Solution for SQL Injection Attack Detection and Prevention", In International Journal of Soft Computing and Engineering, vol. 3, Issue 1, Mar. 2013, pp. 395-398.

Chaturvedi, et al., "Analysis of SQL Injections Attacks and Vulnerabilities", In International Journal of Advanced Research in Computer Science and Software Engineering, vol. 6, Issue 3, Mar. 2016, pp. 106-110.

"SQL Injection Attacks: Detection in a Web Application Environment", Published on: Aug. 3, 2012 Available at: http://www.dbnetworks.com/pdf/sql-injection-detection-web-environment.pdf.

Kharche, et al., "Preventing SQL Injection Attack Using Pattern Matching Algorithym", In Proceedings of Computing Research Repository, Apr. 2015, 8 pages.

Das, et al., "An Approach to Detection of SQL Injection Attack Based on Dynamic Query Matching", In International Journal of Computer Applications, vol. 1, No. 25, Retrieved on: Jun. 11, 2016, pp. 28-34.

Ciampa, et al., "A heuristic-based approach for detecting SQL-injection vulnerabilities in Web applications", In Proceedings of ICSE Workshop on Software Engineering for Secure Systems, May 2, 2010, 7 pages.

Kumar, et al., "A Novel Approach to detect SQL injection in web applications", In International Journal of Application or Innovation in Engineering & Management, vol. 2, Issue 6, Jun. 2013, pp. 37-48.

Chaware, et al., "A Survey on Detection and Prevention of SQL Injection Attack", In International Journal of Science and Research, vol. 3, Issue 12, Dec. 2014, pp. 60-62.

Elshazly, et al., "A Survey of SQL Injection Attack Detection and Prevention", In Journal of Computer and Communications, vol. 2, Jun. 2014, pp. 1-9.

* cited by examiner

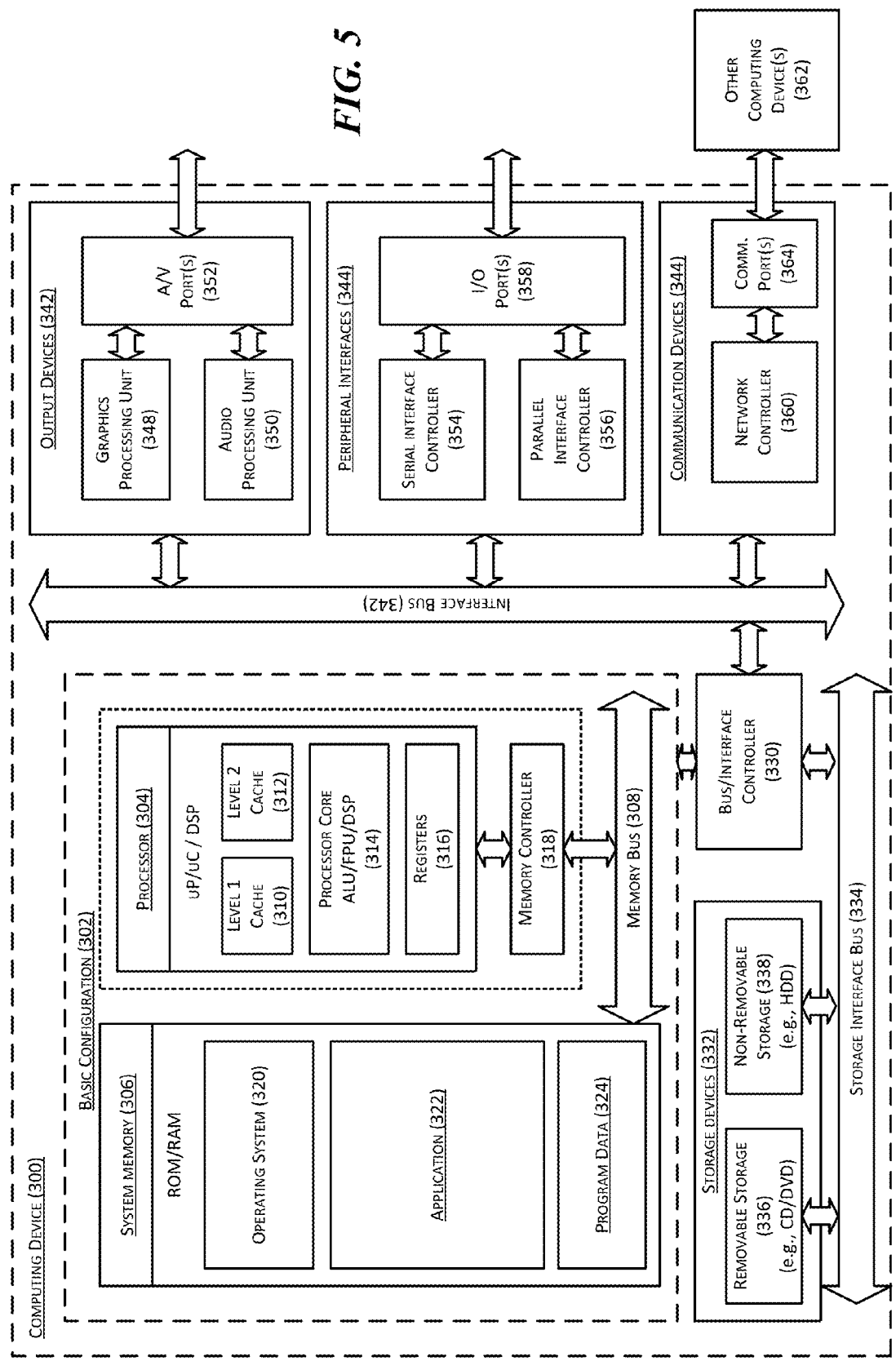

DATABASE QUERY INJECTION DETECTION AND PREVENTION

BACKGROUND

Search engines, electronic commerce websites, online financial exchanges, and other applications typically utilize back-end databases to store records of information to provide designed user experiences. For example, an e-commerce website can have an application (e.g., a webpage) with entry fields configured to receive input from a user. The application can then generate a database statement based on the received input from the user and transmit the database statement to a back-end database server. Upon receiving the database statement, the back-end database server can retrieve suitable records from a database and generate search results in response to the received database statement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Injection attack is a technique used to "hack" applications with back-end databases by exploiting vulnerabilities of the applications. For example, when an application incorrectly handles an input from a user for special characters (e.g., semicolons, single quotation marks, etc.), the application can generate a database statement mistakenly treating a user input having a string value as one or more database commands. Using such database commands, attackers can spoof identity, illegally modify database records, cause repudiation issues (e.g., voiding transactions or changing balances), or even allow complete retrieval or deletion of records in the back-end database.

Parameterized statements, database permissions, and other techniques have been developed in order to mitigate or prevent injection attacks. Such techniques, however, may not be universally applied. In addition, various applications are individually programmed and implemented with different behaviors and functions. As such, a technique suitable for one type of applications can be unsuitable for others.

Several embodiments of the disclosed technology can detect and/or prevent injection attacks with reduced false positive results by tailoring detection based on particular vulnerabilities of individual applications. In certain implementations, an injection detector can normalize a database statement received from an application to generate a syntactic pattern by replacing one or more query values or terms (e.g., string values) with a placeholder value (e.g., zero) in the database statement. The database server can also mark each point at which a placeholder value is inserted as a potential injection point for an injection attack.

The injector detector can also be configured to determine whether the received database statement is syntactically correct and can be properly parsed. If the database statement is syntactically correct and can be properly parsed and identical syntactic pattern has been detected previously, the injection detector can consider the database statement as not imposing security risks. If similar syntactic pattern has not been detected before, the injection detector can determine whether the database statement is a potential injection attack based on previously identified vulnerable injection points in syntactic patterns, as described in more detail below. If the database statement is not a potential injection attack, the database server can save the corresponding syntactic pattern as a record of "normal" syntactic pattern.

If the database statement is syntactically incorrect, the injection detector can be configured to identify one or more previously saved syntactic patterns that can be used to produce the erroneous database statement. For example, the injection detector can iterate through a list of saved syntactic patterns and replace placeholder values at potential injection points with the query value. If the replacement results in a syntactic error, then the injection point in the syntactic pattern can be marked as potentially vulnerable. In embodiments in which multiple syntactic patterns have one or more vulnerable injection points, the database server can select one of the syntactic patterns with the least number of vulnerable injection points as a match for the received database statement.

The injection detector can detect and/or prevent injection attacks based on the determined vulnerable injection points in syntactic patterns. For example, if replacing a vulnerable injection point in a syntactic pattern with the query value is still syntactically valid but not syntactically identical to the original syntactic pattern, the injection detector can indicate that the database statement is a potential injection attack based on certain signatures in the query value. Being syntactically identical refers to having identical database commands, sequence of the database commands, number of database commands, etc. In response to the detected potential injection attack, the injection detector can raise an alarm, issue a notification, discard the database statement, or perform other suitable preventive actions. The injection detector can be implemented as a software application or component executed on a database server associated with the database or a computing device that is separate from the database server associated with the database.

Several embodiments of the disclosed technology can tailor detection of injection attacks to databases based on particularities of associated applications. For example, when attacking an application, attackers typically "probe" the application to see how the application behaves in light of different query values for user input. Based on error messages or the lack thereof, the attackers can then formulate injection attacks on the application and associated back-end database. As such, at least some of the probes can cause the application to generate search queries with syntax errors. In other examples, normal users without malicious intent can also cause the application to generate search queries with syntax errors by misspelling query terms or performing other actions. Irrespective of how the syntax errors are generated, the injection detector can identify vulnerable injection points in syntactic patterns based on the existence and identity of the syntax errors. Thus, by tailoring detection of injection attacks on vulnerable injection points and/or syntactic patterns that are particular to applications, false positive results can be reduced when compared to conventional techniques.

BRIEF DESCRIPTION OF THE DRAWINGS

FIG. 5 is a computing device suitable for certain components of the computing system in FIGS. 1A-1C.

DETAILED DESCRIPTION

Figure 1A:
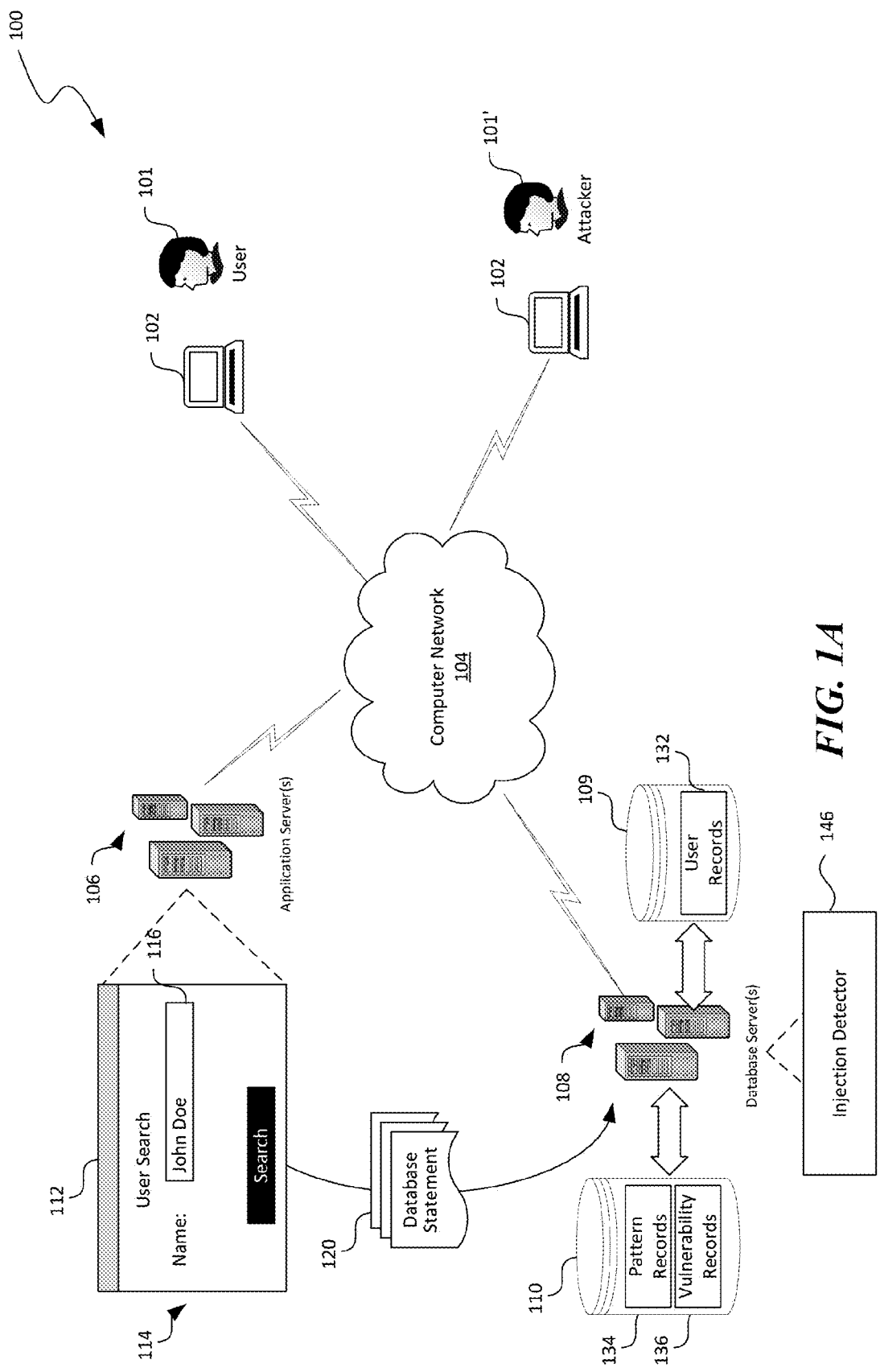
FIGS. 1A-1C are schematic diagrams illustrating a computing system implementing injection attack detection during stages of operation in accordance with embodiments of the disclosed technology.

Certain embodiments of systems, devices, components, modules, routines, data structures, and processes for detection and/or prevention of injection attacks are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-5.

As used herein, the term "injection attack" generally refers to an attack by injecting malicious database commands into an application (e.g., a web application) as user input to, for example, a web form. If successful, an injection attack can manipulate database queries to perform database operations not intended by the programmer. For example, the following example Structured Query Language ("SQL") statement can be used to retrieve a user record with a name John from a table named users:

select * from users where name like 'John'

However, if the application incorrectly sanitizes or incorrectly handles special characters, e.g., semicolons, the application can erroneously generate the following SQL statement:

select * from users where name like ' '; drop table users -'

When executed in the database, the foregoing SQL statement can cause the database to search for a user whose name is blank according to the select command and cause the entire users table being deleted from the database according to the drop command.

Also used herein, the term "database statement" generally refers to a structured statement executable in a database for performing certain requested action(s). For instance, a database statement can request retrieval of certain records in the database based on one or more query terms. The phrase "query terms" generally refers to search parameters or values for requesting records from the database. Query terms can include constants of string, number, currency, date, or other suitable types. For instance, in the examples above, the name John between the single quotation marks is a string constant or "string literal." Similarly, the string in the brackets: [ '; drop table users -] is also a string literal.

As used herein, "parsing" a database query generally refers to examining characters in a database statement and recognizing commands, string literals, and comments by detecting keywords and identifiers and matching an overall structure of the database statement to a set of syntax rules applicable to the database. When a database statement violates one of the syntax rules, the database statement is deemed to contain a "syntax error," and cannot be parsed correctly. For example, the following example SQL statement contains a syntax error because a quote character, the single quotation mark is not properly escaped or designated correctly:

select * from users where name like '%d'Artanian'

Further used herein, the term "syntactic pattern" generally refers to a syntactic structure of a database statement. The syntactic structure can include a number of commands as well as associated sequence of the commands. In certain embodiments, a syntactic pattern can be obtained by replacing individual constants or literals with a placeholder value. For example, 0 can be used to replace string, number, currency, date, or other types of constants. As such, the example SQL statements above can all be related to the following syntactic pattern:

select * from users where name like 0

Each replaced constant can be marked as an injection point in the syntactic pattern. The injection points can also be marked with additional conditions for matching. For example, injection points for string literals can be associated with quotation marks as first and last characters. Certain constants not likely to be generated based on user input can be omitted from being marked as an injection point. For instance, data type sizes, extensible markup language ("XML") paths, and other programming constants can be omitted from being marked as injection points.

Figure 1B:
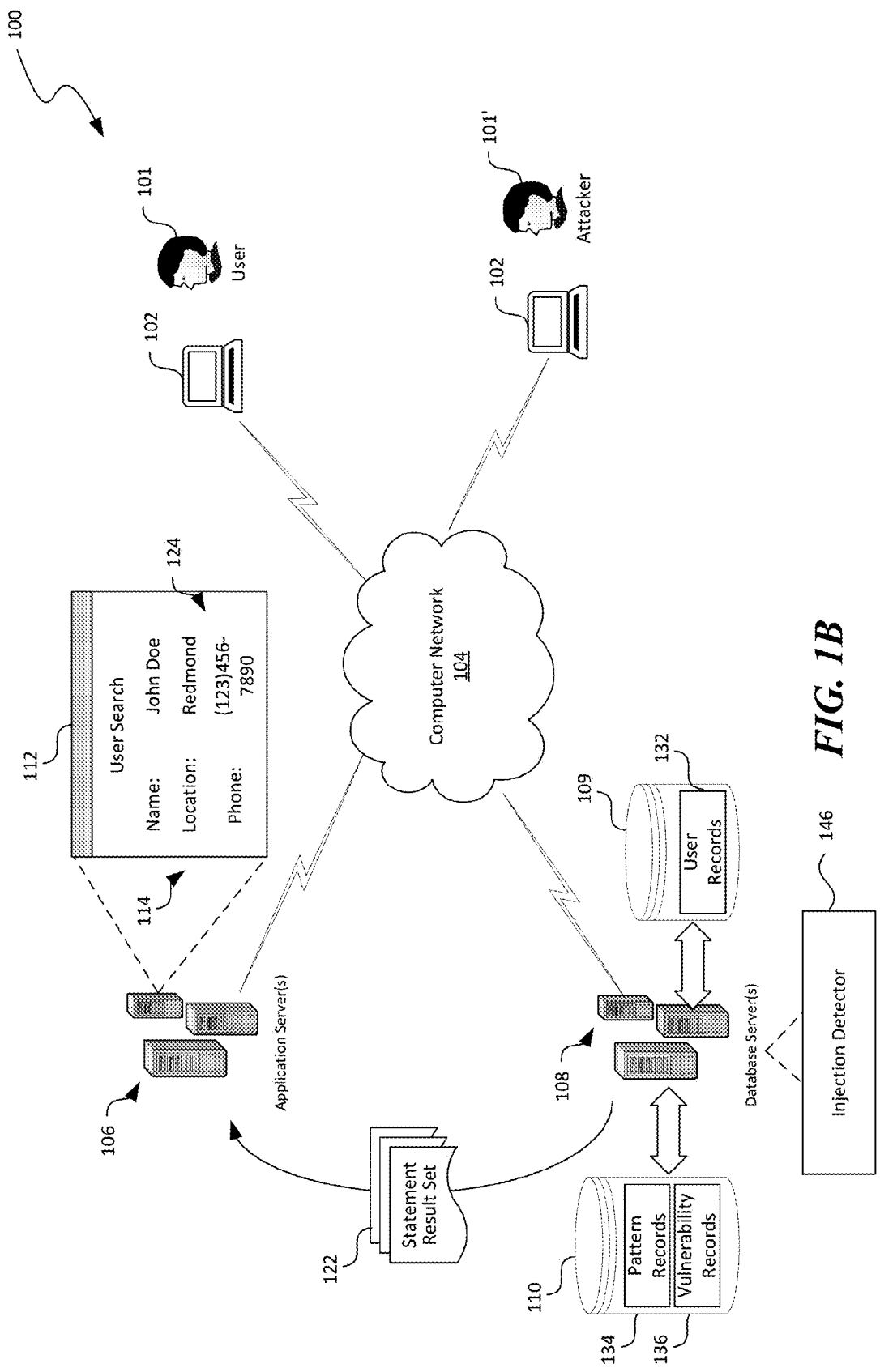
Figure 1C:
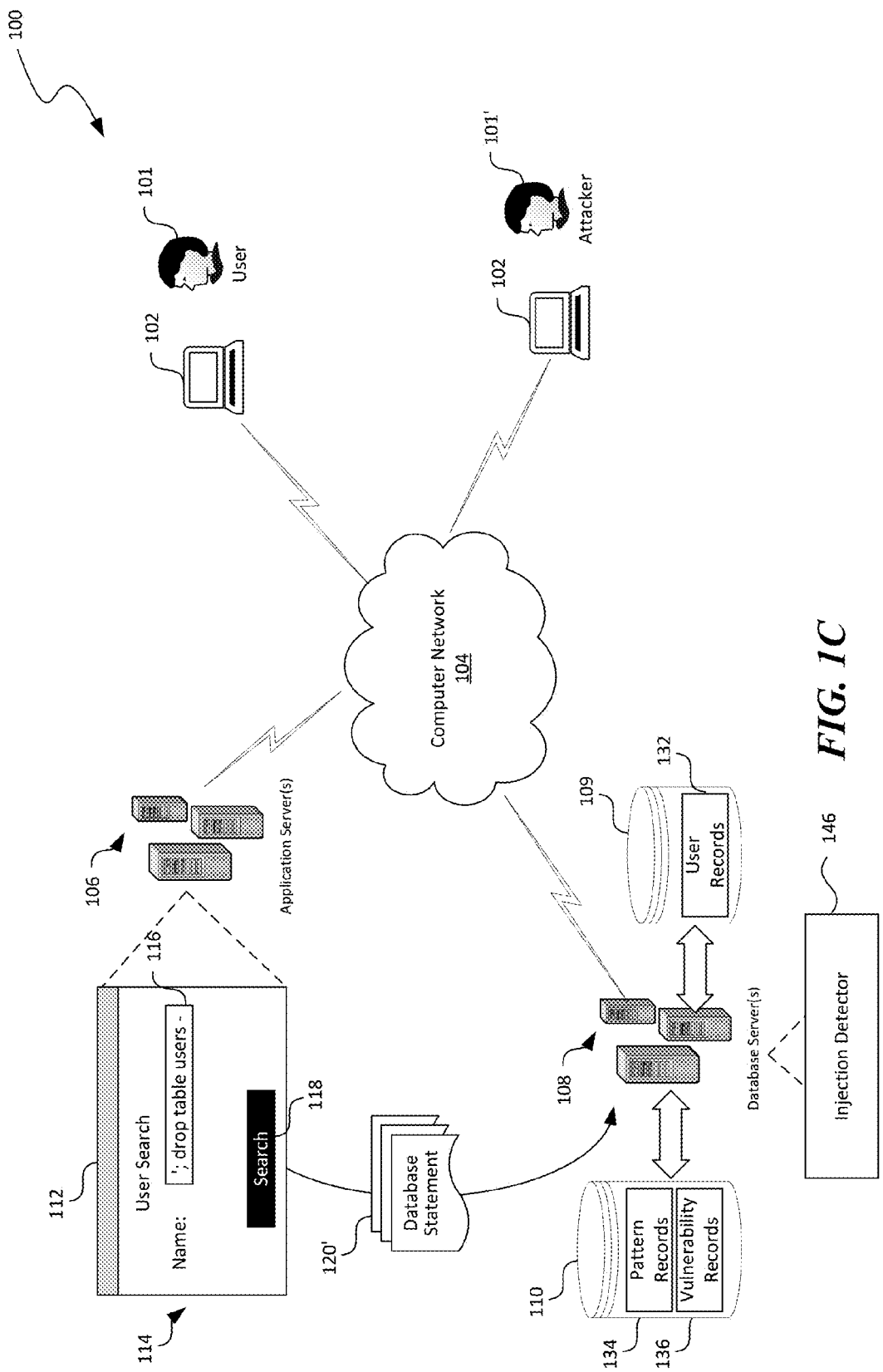

FIGS. 1A-1C are schematic diagrams illustrating a computing system 100 implementing injection attack detection during stages of operation in accordance with embodiments of the disclosed technology. As shown in FIG. 1A, the computing system 100 can include an application server 106, a database server 108, multiple client devices 102 interconnected by a computer network 104. The computer network 104 can include an enterprise intranet, a wide area network, the Internet, or other suitable types of network.

Even though particular components and associated arrangements of the computing system 100 are shown in FIGS. 1A-1C, in other embodiments, the computing system 100 can include additional and/or different components. For example, in certain embodiments, the application server 106 and the database server 108 can be interconnected via another computer network (not shown), contain multiple servers, and/or be integrated into a single computing system. In other embodiments, the computing system 100 can also include caching servers, load balancers, or other suitable components. In the description below, techniques of injection attack detection are described as implemented on the database server 108 for illustration purposes. In certain embodiments, some or all of the techniques disclosed herein can also be implemented on one or more other servers in the computing system 100. For example, some or all of the techniques disclosed herein can be implemented on a proxy server (not shown) between the application server 106 and the database server 108.

The client devices 102 can individually include a computing device that facilitates access to the application server 106 via the computer network 104 by users 101 (identified as a user 101 and an attacker 101'). In the illustrative embodiment, the client devices 102 include laptop computers. In other embodiments, the client devices 102 can also include smartphones or other suitable computing devices. Even though two users 101 are shown in FIGS. 1A-1C for illustration purposes, in other embodiments, the computing system 100 can facilitate any suitable number of users 101 to access the application server 106 via the computer network 104.

The application server 106 can be configured to execute one or more applications 112 configured to facilitate retrieving or otherwise interacting with records (e.g., user records 132) in a database 109 at the database server 108. In the illustrated embodiment, the application 112 includes components that can create a database statement 120 for the database 109 based on user input to, for example, locate a user record 132 in the database 109. The application 112 is configured to provide a user interface, for example, a webpage 114 to the user 101 upon request. In the illustrated example, the webpage 114 contains an input field 116 and a search button 118. The input field 116 can be configured to receive a user input containing a string value, for example, "John Doe" in FIG. 1A. In other embodiments, the application 112 can also include an electronic commerce application, online financial exchange, or other suitable types of application.

In the illustrated example in FIG. 1A, upon actuation of the search button 118 by the user 101, the application 112 can be configured to generate a database statement 120 based on the received user input (e.g., "John Doe") in the input field 116. The database statement 120 can include a statement containing certain database commands and the user input as a query term. For instance, in the example shown in FIG. 1A, the application 112 can generate an SQL statement for searching a user named "John Doe" as follows:

select * from users where name like 'John Doe'

As shown above, the database statement 120 includes a database command (i.e., select), identification of a table (i.e., users), a table column (i.e., name), and a query term "John Doe" for the name variable in the users table of the database 109. The application 112 can then transmit the generated database statement 120 to the database server 108 for execution.

As shown in FIG. 1A, the database server 108 can be configured to facilitate access to the database 109. In the illustrated embodiment, the database server 108 is directly coupled to the database 109. In other embodiments, the database server 108 can facilitate access to the database 109 hosted in a cloud computing facility, a local computing facility, or other suitable facilities. As shown in FIG. 1A, the database 109 can include data in tables containing, for example, user records 132. The user records 132 are example records containing information to facilitate certain designed functions of the application 112. In other embodiments, the database 109 can also contain usage records, pricing records, purchase history records, or other records containing any suitable types of information. As shown in FIG. 1A, the database server 108 can also have access to another database 110 containing pattern records 134 and vulnerability records 136, which are described in more detail below. Even though the pattern records 134 and vulnerability records 136 are shown to be records in the database 110 in FIG. 1A, in other embodiments, information contained in these records 134 and 136 can also be maintained in the database server 108 (or other suitable servers) as metadata or other suitable types of data.

The pattern records 134 can contain records of syntactic patterns derived from search queries 120 previously received from the application 112. In certain embodiments, the pattern records 134 can contain pattern text of a syntactic pattern and a list of injection point(s) in the syntactic pattern. In other embodiments, the pattern records 134 can also include data of last revision, date, or other suitable information. The vulnerability records 136 can contain records of injection points on corresponding syntactic patterns that are determined to be vulnerable to injection attacks. The vulnerability records 136 can also contain data representing vulnerability fidelity, type, attacking history (e.g., an attack count), or other suitable information. Both the pattern records 134 and the vulnerability records 136 can be generated during operation of the computing system 100 and used to detect injection attacks, as described in more detail below.

As shown in FIG. 1B, upon receiving the database statement 120 (FIG. 1A), the database server 108 can be configured to generate statement result set 122 by executing the database statement 120 in the database 109. For instance, in response to the example SQL statement select * from users where name like 'John Doe', the database server 108 is configured to search the database 109 to locate a user record 132 corresponding to a user having a name matching "John Doe" and provide information in the user record 132 to the application 106 as statement result set 122. The application 112, in turn, can be configured to display the information in the user record 132 to the user 101. In the illustrated embodiment, the displayed information 124 in the user record 132 is shown to include a location and a phone number for illustration purposes. In other embodiments, the displayed information 124 can also include any other suitable types of information.

The application 112 often can have programmatic features with vulnerabilities that an attacker 101' can exploit to gain unauthorized access to the database 109. For example, the attacker 101' can "probe" the application 112 by submitting various query terms into the input field 116 to see how the application 112 behaves in response. For example, the attacker 101 can enter a single quotation mark into the input field 116 and then actuate the search button 118. If the application 112 is properly implemented, the single quotation mark entered into the input field 116 can be properly handled or escaped. If the application 112 is not properly implemented to escape the single quotation mark, the database server 108 would find a parsing error in the database statement 120 and indicate accordingly to the application server 106. In turn, the application 112 can indicate to the attacker 101' that a failure to execute the database statement 120 is encountered. The indication can inform the attacker 101' that the application 112 is vulnerable to the input, and application 112 is thus vulnerable to create database statements 120 not anticipated or intended by the application creator. By exploring such vulnerability via injection attacks, an attacker 101' can operate on the database 109 via the application even though the attacker 101' doesn't have access to the database 109.

Through such probes, the attacker 101' can detect various vulnerabilities of the application 112. The attacker 101' can then formulate a query term for an injection attack. For example, the attacker 101' can enter '; drop table users - into the input field 116 to cause the application 112 to generate a database statement 120' containing the following database statement:

select * from users where name like ' '; drop table users -'

Upon reception, the database server 108 can parse the above example database statement 120' without syntax errors as two database commands separated by the semicolon instead of a string value of the query term because the received input in quotation mark was not escaped by the application 112. Thus, the database server 108 can interpret the foregoing database statement 120' as a first database command to select a user with a name that is blank from the users table and a second database command to delete the table users from the database 109. Such an injection attack can cause serious damage to data security of the user records 132 in the database 109.

Several embodiments of the disclosed technology can detect and prevent such injection attacks by implementing an injection detector 146 to monitor search queries 120 received from the application 112 and categorize syntactic patterns based on the received search queries 120. In the following description, the injection detector 146 is described as a component of the database server 108. In other embodiments, at least a portion of the injection detector 146 can be embodied as an independent application executing on the database server 108, on a server (not shown) separate from the database server 108, or in other suitable configurations.

Referring back to FIG. 1A, in certain embodiments, upon receiving the database statement 120, the injection detector 146 can be configured to determine a syntactic pattern of the database statement 120 by, for instance, replacing literals with a placeholder value. As such, in the example above, the string literal John Doe can be replaced by a placeholder value (e.g., 0) to derive the following syntactic pattern:

select * from users where name like 0

The injection detector 146 can be configured to determine whether the received database statement 120 is syntactically correct and thus can be properly parsed. For example, the injection detector 146 can determine whether any portion of the database statement associated with the database statement 120 violates one or more of a set of syntax rules associated with a query language used in the database 109. In the example shown in FIG. 1A, the database statement 120 contains database statement select * from users where name like 'John Doe', which can be properly parsed according to SQL syntax.

If the database statement 120 is syntactically incorrect, the injection detector 146 can be configured to identify one or more previously saved syntactic patterns from the pattern records 134 that match the erroneous database statement 120. The erroneous database statement 120 was likely created by the application 112 in response to a malicious input created by the attacker 101' while the application 112 was building a database statement 120 in accordance to logic captured by the previously saved syntactic patterns, or in response to an erroneous input by the user 101. For example, the database server 108 can iterate through a list of saved syntactic patterns in the pattern records 134 to match parts of a syntactic pattern that are not injection point(s) with corresponding parts in the erroneous database statement 120. The injection detector 146 can then replace placeholder values at injection points with the query term. If the replacement results in a syntactic error, then the injection point and the syntactic pattern can be marked as vulnerable. For instance, one of the pattern records 134 can contain the following syntactic pattern:

select * from users where name like 0

Thus, replacing the placeholder value, i.e., 0, with a user input of a single quotation mark would result in the following database statement:

select * from users where name like ''' which causes a syntax error due to a quotation mark mismatch. Thus, the foregoing syntactic pattern can be marked as having a vulnerable injection point and saved in the database 110 as a vulnerability record 136. In embodiments in which multiple syntactic patterns match the erroneous database statement 120, the injection detector 146 can select one of the syntactic patterns with the least number of vulnerable injection points as a match for the received database statement 120.

If the database statement 120 is syntactically correct and can be properly parsed, the injection detector 146 can be configured to determine whether a pattern record 134 corresponding to the determined syntactic pattern already exists in the database 110. If one already exists, the database statement 120 can be considered as legitimate while the database statement 120 is executed to generate the statement result set 122, as shown in FIG. 1B. If one does not exist, the injection detector 146 can be configured to determine whether the database statement 120 is a potential injection attack based on previously identified vulnerable injection points in syntactic patterns contained in the vulnerability records 136. For instance, if the database statement 120 matches a syntactic pattern with an injection point at which an injection point has been detected, the injection detector 146 can indicate that the database statement 120 is an injection attack. Otherwise, if replacing an injection point in a syntactic pattern with the query term is still syntactically valid but not syntactically identical to the original syntactic pattern, and the query term contains comments, reference to system resources, or other suitable signatures or if execution of the database statement 120 leads to run-time error, the injection detector 146 can indicate that the database statement 120 is an injection attack, and update a corresponding vulnerability record 136 by, for example, incrementing an attack count. One example detection operation is illustrated with reference to FIG. 1C below.

As shown in FIG. 1C, the application 114 can generate the following database statement 120' based on user input into the input field 116:

select * from users where name like ' '; drop table users -'

One of the pattern record 134 can include the following syntactic pattern:

select * from users where name like 0

Thus, replacing the placeholder value 0 with the query term '; drop table users—can produce the same database statement 120'. However, the received database statement 120' is not syntactically identical to the syntactic pattern because the syntactic pattern of the received database statement 120 includes two database commands (i.e., select and drop) while the existing syntactic pattern only includes one database command (i.e., select).

In response to the determination that the database statement 120' has a new syntactic pattern, in certain embodiments, the injection detector 146 can be configured to determine whether the database statement 120' involves an injection attack by determining whether the injection point in the syntactic pattern above has been attached before. For example, if one of the vulnerability record 136 indicates that the injection point (i.e., "0) has been attacked before, the injection detector 146 can indicate that the database statement 120' involves an injection attack and, in certain implementations, disallow execution of the database statement 120' in the database 109, notifying an administrator of the database 109 that an injection attack is detected, and/or perform other suitable actions. If the vulnerability records 136 does not indicate that the injection point has been attacked before, the injection detector 146 can determine whether the query term contains comments, reference to system resources, or other suitable signatures or if execution of the database statement 120' leads to run-time error. In the illustrated example in FIG. 1C, the query term indeed includes comments and can lead to runtime errors. In response, the injection detector 146 can mark the injection point as attacked, as described above. If the query term does not include the foregoing signatures, the injection detector 146 can consider the database statement 120' as not involving security risks and save the corresponding syntactic pattern as a pattern record 134 in the database 110.

Several embodiments of the disclosed technology can tailor detection of injection attacks based on particularities of associated applications. For example, when attacking the application, the attacker 101' can "probe" the application 112 to see how the application 112 behaves in light of different query terms or values provided to the input field 116. Based on error messages or the lack thereof, the attacker 101' can then formulate injection attacks on the application 112 to gain access to the associated database 109. As such, at least some of the probes can cause the application 112 to generate search queries 120 with syntax errors specific to programming of the application 112. In other examples, the user 101 can also cause the application 112 to generate search queries 120 with syntax errors by misspelling query terms or performing other actions.

Irrespective of how the syntax errors are generated, the injection detector 146 can be configured to identify vulnerable injection points in syntactic patterns based on the existence and identity of the syntax errors. Thus, by tailoring detection of injection attacks on vulnerable injection points and/or syntactic patterns that are particular to the application 112, false positive results can be reduced when compared to other techniques.

Figure 2:
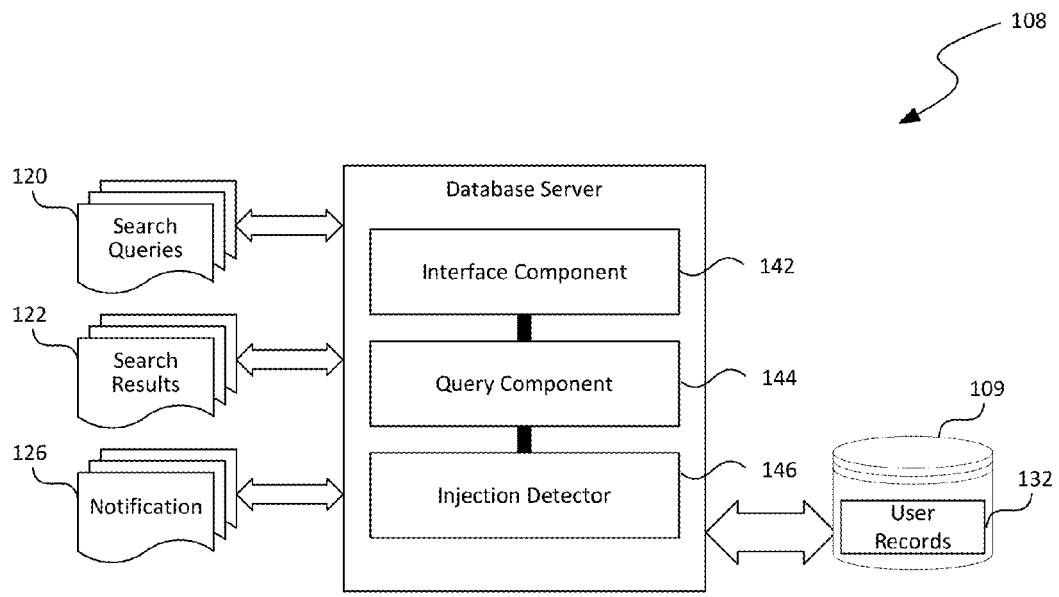
FIG. 2 is a schematic diagram illustrating certain hardware/software components of the database server of FIGS. 1A-1C in accordance with embodiments of the disclosed technology.

FIG. 2 is a schematic diagram illustrating certain hardware/software components of the database server 108 of FIGS. 1A-1C in accordance with embodiments of the disclosed technology. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

The database server 108 can include one or more processors coupled to a memory containing instructions executable by the one or more processors to cause the processors to provide certain functional components. For example, as shown in FIG. 2, the database server 108 can include an interface component 142, a query component 144, and an injection detector 146 interconnected with the database 110. In one embodiment, all of the foregoing software components can reside on a single computing device (e.g., the database server 108). In other embodiments, the software components can also reside on a plurality of distinct computing devices such as servers in a datacenter. In further embodiments, the software components may also include network components and/or other suitable modules or components (not shown). In yet further embodiments, at least one of the foregoing components (e.g., the injection detector 146) can reside on another server separate from the database server 108.

As shown in FIG. 2, the interface component 142 can be configured to receive search queries 120 from the application 112 (FIG. 1A). The interface component 142 can also be configured to provide the search results 124 generated based on the user records 132 in the database 109 to the application 112. In certain embodiments, the interface component 142 can include a network interface module with suitable firmware or software to perform the foregoing operations. In other embodiments, the interface component 142 can include other suitable types of communications modules.

The query component 144 can be configured to execute database statements of the search queries 120. For example, the query component 144 can be configured to retrieve certain user records 132 based on search terms included in the search queries 120. In another example, the query component 144 can also be configured to create, update, delete, or otherwise manipulate the user records 132 in the database 109. In further examples, the query component 144 can be configured to perform other suitable actions in the database 109.

The injection detector 146 can be configured to detect and/or prevent injection attacks based on the pattern records 134 and/or the vulnerability records 136 in the database 110. In certain embodiments, if a database statement 120 can be parsed correctly and a syntactic pattern of the database statement 120 exists as a pattern record 134 in the database, the injection detector 146 can consider the database statement 120 as "safe." If the syntactic pattern of the database statement 120 corresponds to a syntactic pattern containing vulnerable injection point that has been attacked as indicated in a vulnerability record 136, the database statement 120 can be designated as an injection attack even if the database statement 120 can be parsed correctly. Various modules and operations of the injection detector 146 are described below with reference to FIG. 3.

Figure 3:
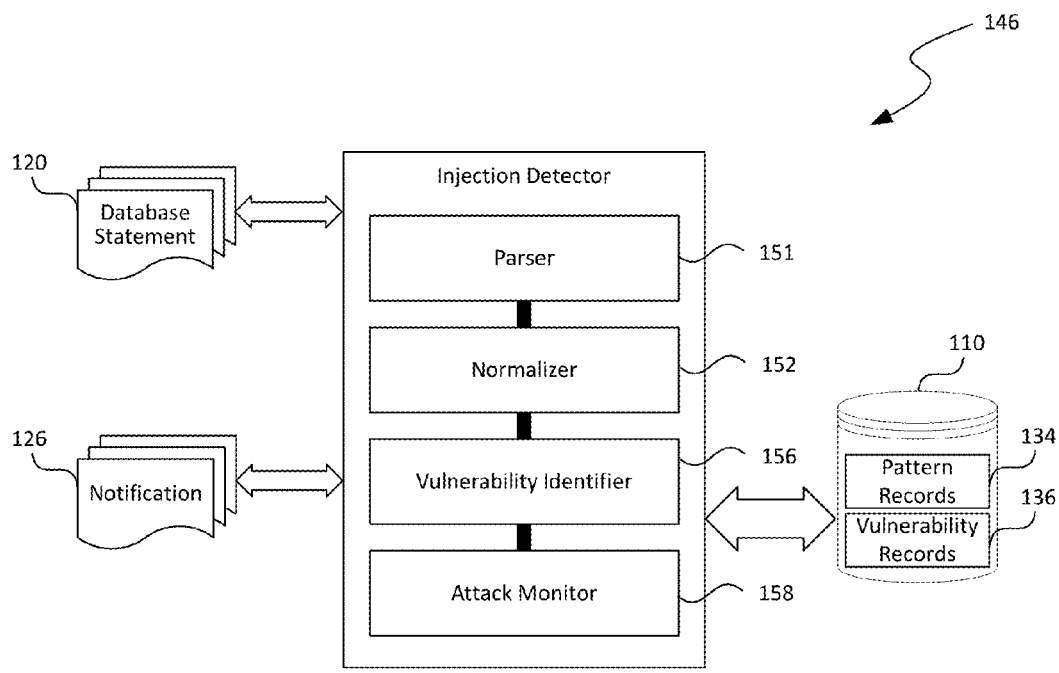
FIG. 3 is a schematic diagram illustrating certain hardware/software components of the injection detector in FIG. 2 in accordance with embodiments of the disclosed technology.

FIG. 3 is a schematic diagram illustrating certain hardware/software components of the injection detector 146 in FIG. 2 in accordance with embodiments of the disclosed technology. As shown in FIG. 3, the injection detector 146 can include a parser 151, a normalizer 152, a vulnerability identifier 156, and an attack monitor 158 interconnected with one another. Though particular modules are shown in FIG. 3, in other embodiments, the injection detector 146 can also include input/output modules, database access modules, or other suitable types of modules.

The parser 151 can be configured to monitor and detect whether the database statement 120 can be parsed correctly based on a query language associated with the database 109. For example, the database 109 can implement SQL, query by example, natural language, contextual query language, or other suitable types of query language individually associated with a set of syntax rules. For instance, SQL requires a database statement designed to add a user record 132 to the users table to be in the following structure:

INSERT INTO users
(name, location, phone)
VALUES
('Jane Doe', 'Seattle', NULL);

The parser 151 can then be configured to determine whether a database statement follows or violates one or more of the syntax rules. If a database statement violates at least one syntax rule, the parser 151 can indicate that the corresponding database statement cannot be parsed correctly.

The normalizer 152 can be configured to determine a syntactic pattern of a database statement 120. In certain embodiments, the normalizer 152 can be configured to replace literals in the database statement 120 with a placeholder value. The literals can be of a string, number, date, currency, or other suitable type of values. One example syntactic pattern derived from the database statement 120 shown in FIG. 1A can be as follows:

select * from users where name like 0

Embodiments of normalizing search queries 120 are described in more detail below with reference to FIG. 4B.

The vulnerability identifier 156 can be configured to identify potential vulnerabilities of the application 112 to injection attacks when the application 112 generates erroneous database statements. In certain embodiments, the vulnerability identifier 156 can receive an indication that a database statement 120 cannot be parsed correctly. In response, the vulnerability identifier 156 can retrieve a syntactic pattern corresponding to one or more previously received search queries 120. The vulnerability identifier 156 can then determine whether replacing the placeholder in the retrieved syntactic pattern can cause the same syntax error as the received database statement 120 does. If the same syntax error is detected, the vulnerability identifier 156 can then mark the retrieved syntactic pattern as having a vulnerable injection point and save as a vulnerability record 136. In other embodiments, the vulnerability identifier 156 can also iterate through a list of syntactic patterns in the database 109 and select one with the least number of vulnerable injection points as the vulnerable syntactic pattern. Embodiments of detecting vulnerability of the application 112 are described in more detail below with reference to FIG. 4D.

The attack monitor 158 is configured to detect whether a received database statement 120 is a potential injection attack. For example, the attack monitor 158 can replace an injection point in a syntactic pattern contained in a pattern record 134 with the query term of the received database statement 120 and determine whether the replaced syntactic pattern is still syntactically valid. If the vulnerable syntactic pattern is still valid but not syntactically identical to the syntactic pattern of the received database statement 120, the attack monitor 158 can indicate that the database statement 120 is an injection attack if the injection point has been attacked before, as indicated by a vulnerability record 136. In response to the detected injection attack, the attack monitor 158 can raise an alarm, issue a notification 126 to, for example, owner of the database 109, discard the database statement 120, or perform other suitable remedial actions. Embodiments of monitoring for injection attacks are described in more detail below with reference to FIG. 4C.

FIGS. 4A-4D are flowcharts illustrating various processes of detecting injection attacks in accordance with embodiments of the disclosed technology. Even though various embodiments of the processes are described below with reference to the computing system 100 of FIGS. 1A-1C and the software components of FIGS. 2 and 3, in other embodiments, the processes can also be performed with other suitable types of computing frameworks, systems, components, or modules.

Figure 4A:
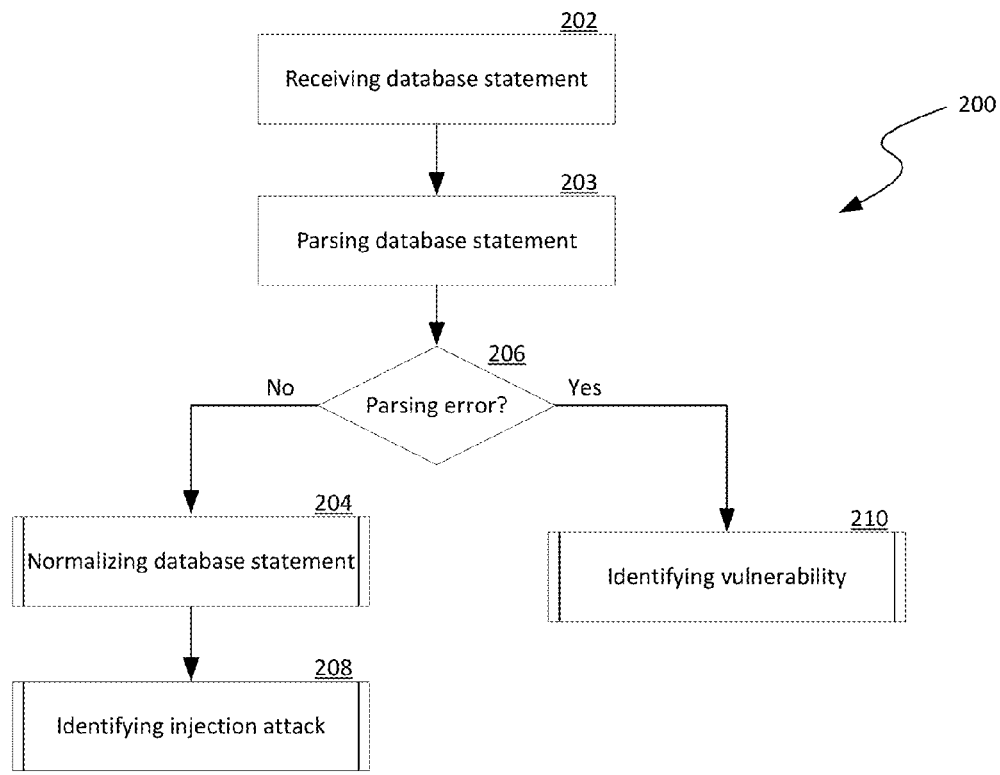
FIGS. 4A-4D are flowcharts illustrating various processes of detecting injection attacks in accordance with embodiments of the disclosed technology.

As shown in FIG. 4A, a process 200 can include receiving a database statement at stage 202. In certain embodiments, the database statement can be generated by an application based on user input and received at a database server. In other embodiments, the database statement can be generated by a user directly or by other suitable entities. The process 200 can then include parsing the received database statement based on a set of syntactic rules associated with a database at stage 203.

The process 200 can then include a decision stage 206 to determine whether the received database statement causes a parsing error based on, for example, the set of syntax rules associated with the database. In response to determining that the received database statement causes a parsing error, the process 200 proceeds to identifying vulnerability of the application or other source from which the database statement is received at stage 210. In response to determining that the received database statement does not cause any parsing error, the process 200 proceeds to normalizing the received database statement at stage 204. Normalizing the database statement can include replacing various types of constants or literals with a placeholder value. An example of normalizing a database statement is described in more detail below with reference to FIG. 4B. The process 200 can then proceed to identifying potential injection attack at stage 208. An example of identifying vulnerability is described in more detail below with reference to FIG. 4C. An example of identifying vulnerability is described in more detail below with reference to FIG. 4D.

Figure 4B:
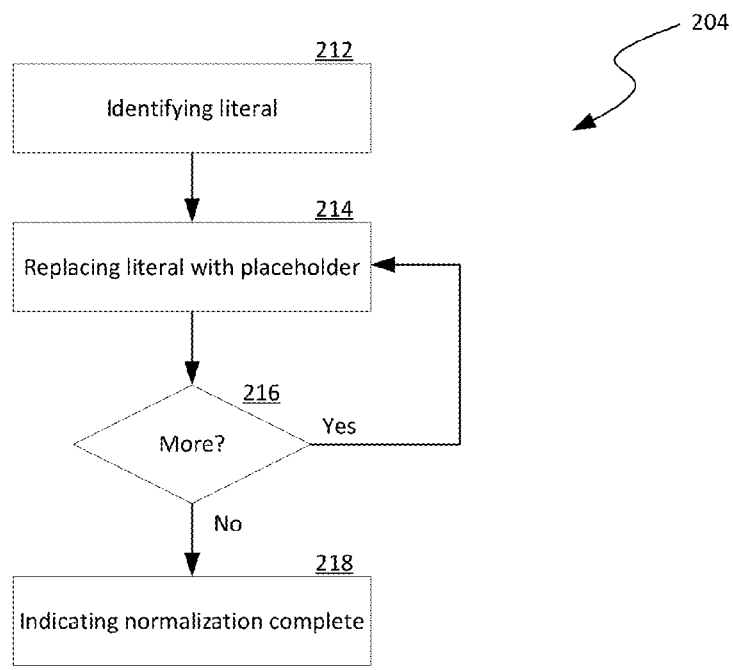

FIG. 4B illustrates example operations of normalizing a received database statement in accordance with embodiments of the disclosed technology. As shown in FIG. 4B, the operations include identifying a literal in a database statement associated with the database statement at stage 212. In certain embodiments, only a literal that can be generated based on user input is identified. Literals of programming origin can be ignored. In other embodiments, all literals can be identified.

The operations can then include replacing the identified literal with a placeholder value, and marking the placeholder value as a potential injection point for injection attacks at stage 214. The operations can then include a decision stage 216 to determine whether the database statement includes additional literals. If another literal is detected, the operations revert to replacing the another literal with a placeholder value at stage 214. If no more literal is detected in the database statement, the operations proceed to indicating that normalization is completed at stage 218.

Figure 4C:
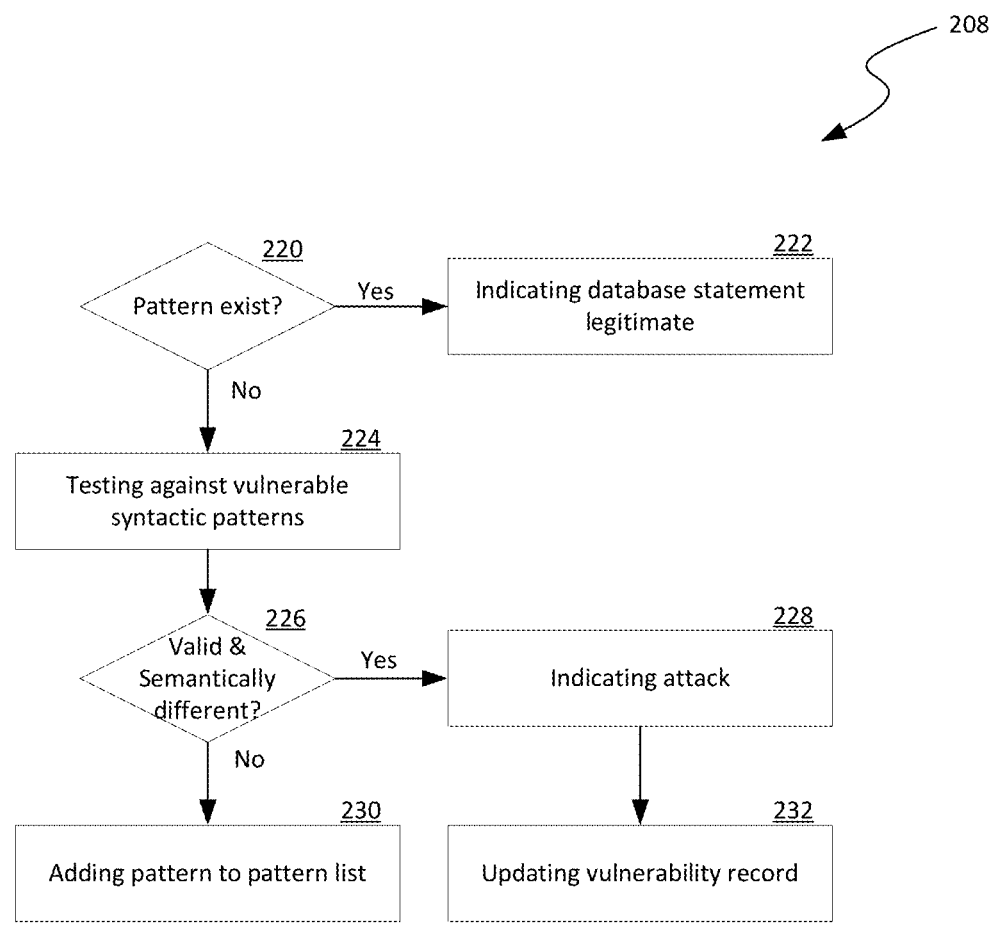

FIG. 4C illustrates example operations of identifying potential injection attacks in accordance with embodiments of the disclosed technology. As shown in FIG. 4C, the operations can include a decision stage 220 to determine whether a corresponding syntactic pattern identical to that of the received database statement already exists. If one already exists, the operations proceed to indicating that the database statement is legitimate at stage 222. If one does not exist, the operations proceed to testing the database statement against syntactic patterns previously determined to contain vulnerable injection points at stage 224. In one embodiment, the operations can include retrieving a syntactic pattern and replacing an injection point thereof with the query term from the received database statement. In other embodiments, the database statement can be matched with a syntactic pattern in other suitable manners.

The operations can then include another decision stage 226 to determine whether the syntactic pattern with the replaced query term is still syntactically valid but not syntactically identical to the syntactic pattern of the database statement. If the determination is positive, the operations can indicate a match is found and can include performing attack detection based on the match. For example, if the injection point is already classified as related to an attack, the database statement is considered an attack. The corresponding vulnerability record can be updated, for example, by incrementing an attack count. If the vulnerability was not yet classified as an attack, the operations can classify the match. For instance, upon determining that certain signatures, comments, references to access system resources, and/or query results in certain run-time errors exist inside the match, the match can be classified as an attack. The operations can then include marking this vulnerable injection point as attacked and indicating the database statement as an injection attack at stage 228 and updating a corresponding vulnerability records at stage 232. If there is a match, but the injection point doesn't have attack classification, the match is not classified as an attack. The operations can then include adding the normalized pattern for the database statement to a pattern record as a legitimate pattern at stage 230.

Figure 4D:
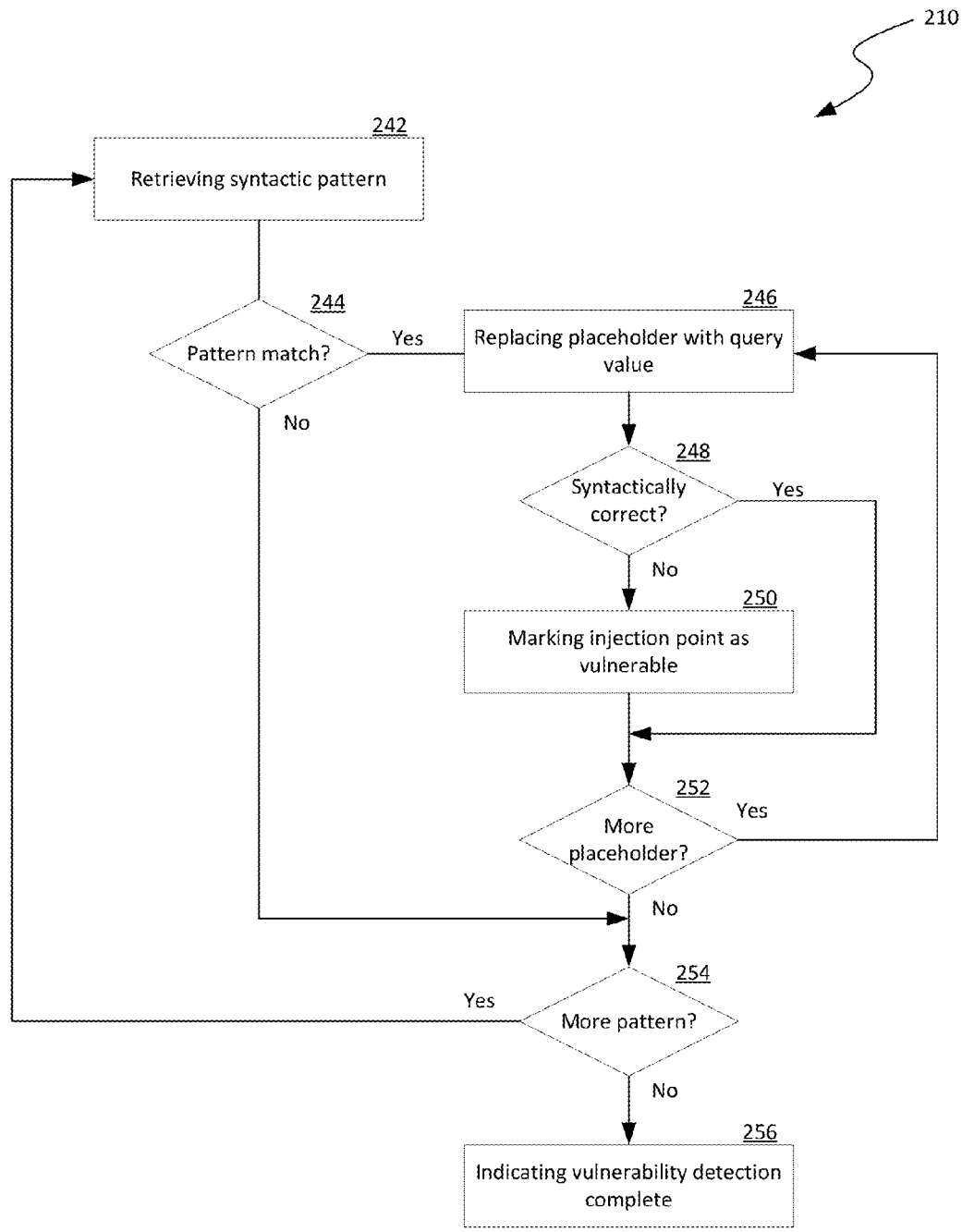

FIG. 4D illustrates example operations of identifying vulnerability in applications in accordance with embodiments of the disclosed technology. As shown in FIG. 4D, the operations can include retrieving a syntactic pattern from a database at stage 242. The syntactic pattern can correspond to one or more previously received search patterns. The operations can then include a decision stage 244 to determine whether the retrieved syntactic pattern matches that of the database statement. If no match is found, the operations proceeds to another decision stage 254 to determine whether additional syntactic patterns exist in the database. If no more syntactic patterns exist in the database, the operations proceed to indicating that vulnerability detection is completed at stage 256. If syntactic patterns exist in the database, the operations revert to retrieving another syntactic pattern at stage 242.

If the retrieved syntactic pattern matches that of the database statement, the operations proceed to replacing placeholder(s) in the retrieved syntactic pattern with a query term or value in the database statement at stage 246. The operations can then include another decision stage 248 to determine whether the retrieved syntactic pattern replaced with the query value is syntactically correct. If the retrieved syntactic pattern replaced with the query value is not syntactically correct, the operations include marking the retrieved syntactic pattern and/or the placeholder value as vulnerable for injection attacks at stage 250. If the retrieved syntactic pattern replaced with the query value is syntactically correct, the operations proceed to another decision stage 252 to determine whether the retrieved syntactic pattern includes additional placeholder values. If the retrieved syntactic pattern includes additional placeholder values, the operations revert to replacing another placeholder value with the query value at stage 246. If the retrieved syntactic pattern does not include additional placeholder values, the operations proceed to decision stage 254, as described above.

FIG. 5 is a computing device 300 suitable for certain components of the computing system 100 in FIGS. 1A-1C. For example, the computing device 300 can be suitable for the application server 106, the database server 108, or the client devices 102 of FIGS. 1A-1C. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method for detecting injection attacks, the method comprising:
   receiving, via a computer network, a database statement generated by an application executing on an application server, the database statement containing a query term for conducting a search in a database;
   determining whether parsing the received database statement causes a syntax error; and
   in response to determining that parsing the received database statement causes a syntax error,
      determining whether a syntactic pattern causes the same syntax error when the query term of the received database statement is inserted into an injection point in the syntactic pattern, the syntactic pattern corresponding to a distinct syntactic structure; and
      in response to determining that the syntactic pattern with the inserted query term causes the same syntax error, marking and storing the injection point in the syntactic pattern as vulnerable and detecting an injection attack based on the stored vulnerable injection point.

2. The method of claim 1 wherein determining whether parsing the received database statement cause a syntax error includes determining whether the received database statement cause a syntax error based on a set of syntax rules.

3. The method of claim 1, further comprising retrieving the syntactic pattern in response to determining that the received database statement causes a syntax error, the retrieved syntactic pattern corresponding to multiple previously received database statements from the application, the multiple previously received database statements having the distinct syntactic structure but with different query terms.

4. The method of claim 1, further comprising:
   retrieving the syntactic pattern in response to determining that the received database statement causes a syntax error, the retrieved syntactic pattern corresponding to multiple previously received database statements from the application, the multiple previously received database statements having the distinct syntactic structure but with different query terms; and
   in response to determining that parsing the syntactic pattern with the inserted query term does not cause the same syntax error, retrieving another syntactic pattern and determining whether parsing the retrieved another syntactic pattern causes the same syntax error when the query term of the received database statement is inserted into the another syntactic pattern.

5. The method of claim 1 wherein:
   the injection point in the retrieved syntactic pattern includes a placeholder value representing a query term; and
   determining whether parsing the syntactic pattern causes the same syntax error includes:
      replacing the placeholder value at the injection point with the query term from the received database statement; and
      determining whether parsing the syntactic pattern having the placeholder value replaced with the query term causes the same syntax error.

6. The method of claim 1, further comprising:
   in response to determining that parsing the received database statement does not cause a syntax error,
      determining a syntactic pattern corresponding to the received database statement by replacing one or more query terms with a placeholder value;
      determining whether an identical syntactic pattern already exists based on previously received database statements; and
      in response to determining that an identical syntactic pattern exists in the database, indicating that the received database statement is legitimate.

7. The method of claim 1, further comprising:
   in response to determining that parsing the received database statement does not cause a syntax error,
      determining a syntactic pattern corresponding to the received database statement by replacing one or more query terms with a placeholder value;
      determining whether an identical syntactic pattern already exists in the database; and
      in response to determining that an identical syntactic pattern does not exist in the database, determining whether the determined syntactic pattern of the received database statement corresponds to a syntactic pattern having an injection point marked as attacked; and in response to determining that the syntactic pattern of the received database statement corresponds to a syntactic pattern having an injection point marked as attacked, performing at least one of disallowing execution of the database statement in the database, notifying an administrator of the database that an injection attack is detected, or updating the vulnerable syntactic pattern in the database.

8. The method of claim 1, further comprising:
in response to determining that parsing the received database statement does not cause a syntax error,
determining a syntactic pattern corresponding to the received database query by replacing one or more query terms with a placeholder value;
determining whether an identical syntactic pattern already exists;
in response to determining that an identical syntactic pattern does not exist,
determining whether the determined syntactic pattern of the received database statement contains a query term with comments or references to system resources; and
in response to determining that the query term contains comments or references to system resources, marking an injection point associated with the placeholder value as attacked and storing the attacked injection point as a vulnerability record.

9. A method for detecting injection attacks, the method comprising:
receiving, via a computer network, a database statement generated by an application, the database statement containing a query term and having a syntactic pattern;
determining whether parsing the received database statement cause a syntax error; and
in response to determining that parsing the received database statement does not cause a syntax error,
determining whether the syntactic pattern of the received database statement matches any existing syntactic pattern associated with one or more previously received database statements; and
in response to determining that the syntactic pattern of the received database statement does not match any existing syntactic pattern,
determining whether the received database statement matches an existing syntactic pattern when the query term is inserted into an injection point in the existing syntactic pattern; and
in response to determining that the received database statement matches the existing syntactic pattern, indicating that the received database statement involves an injection attack.

10. The method of claim 9 wherein indicating that the received database statement involves an injection attack includes disallowing execution of the database statement in the database, notifying an administrator of the database that an injection attack is detected, or updating an attack count related to the injection point of the existing syntactic pattern.

11. The method of claim 9 wherein determining whether the syntactic pattern of the received database statement matches any existing syntactic pattern includes:

determining whether a syntactic pattern identical to the syntactic pattern of the received database statement exists; and in response to determining that an identical syntactic pattern exists in the database, indicating that the database statement does not involve an injection attack.

12. The method of claim 9, further comprising:
in response to determining that the received database statement matches the existing syntactic pattern,
determining whether the injection point in the existing syntactic pattern has been attacked before; and
in response to determining that the injection point in the existing syntactic pattern has been attacked before, indicating that the received database statement involves an injection attack.

13. The method of claim 9, further comprising:
in response to determining that the received database statement matches the existing syntactic pattern,
determining whether the injection point in the existing syntactic pattern has been attacked before; and
in response to determining that the injection point in the existing syntactic pattern has not been attacked before, determining whether the query term includes at least one of a comment or reference to a system resource; and in response to determining that the query term includes at least one of a comment or reference to a system resource, indicating that the received database statement involves an injection attack.

14. The method of claim 9, further comprising:
in response to determining that the received database statement matches the existing syntactic pattern,
determining whether the injection point in the existing syntactic pattern has been attacked before; and
in response to determining that the injection point in the existing syntactic pattern has not been attacked before, determining whether execution of the database statement causes a runtime error; and in response to determining that execution of the database statement causes a runtime error, indicating that the received database statement involves an injection attack.

15. The method of claim 9, further comprising:
in response to determining that the received database statement matches the existing syntactic pattern,
determining whether the injection point in the existing syntactic pattern has been attacked before; and
in response to determining that the injection point in the existing syntactic pattern has not been attacked before, determining whether the query term includes at least one of a comment or reference to a system resource or execution of the database statement causes a runtime error; and in response to determining that the query term does not include at least one of a comment or reference to a system resource and execution of the database statement does not cause a runtime error, indicating that the received database statement does not involve an injection attack and saving the syntactic pattern of the received database statement as a pattern record.

16. The method of claim 9, further comprising:
in response to determining that the received database statement matches the existing syntactic pattern,
determining whether the injection point in the existing syntactic pattern has been attacked before; and
in response to determining that the injection point in the existing syntactic pattern has not been attacked before, determining whether the query term includes at least one of a comment or reference to a system resource or execution of the database statement causes a runtime error; and in response to determining that the query term includes at least one of a comment or reference to a system resource or execution of the database statement causes a runtime error, indicating that the received database statement involves an injection attack.

17. A computing device interconnected with an application server via a computer network, the computing device comprising:
a processor and a memory containing instructions executable by the processor to cause the processor to perform a process that includes:
determining whether parsing a database statement received from an application on the application server cause a syntax error in a database; and
in response to determining that parsing the received database statement does not cause a syntax error,
determining whether an identical syntactic pattern already exists, the identical syntactic pattern having identical number and sequence of database commands as that of the received database statement; and
in response to determining that an identical syntactic pattern already exists in the database, indicating that the received database statement does not involve an injection attack.

18. The computing device of claim 17 wherein the process performed by the processor further includes:
in response to determining that an identical syntactic pattern already does not exist in the database,
determining whether the syntactic pattern of the received database statement corresponds to a syntactic pattern having an injection point that has previously been under an injection attack; and
in response to determining that the syntactic pattern of the received database statement corresponds to a syntactic pattern having an injection point that has previously been under an injection attack, indicating an injection attack is detected.

19. The computing device of claim 17 wherein the process performed by the processor further includes:
in response to determining that an identical syntactic pattern already does not exist in the database,
determining whether the syntactic pattern of the received database statement corresponds to a syntactic pattern having an injection point previously been under an injection attack; and
in response to determining that the syntactic pattern of the received database statement does not correspond to a syntactic pattern having an injection point previously been under an injection attack, determining whether a query term of the received database statement includes at least one of a comment or reference to a system resource or execution of the database statement causes a runtime error; and in response to determining that the query term includes at least one of a comment or reference to a system resource or execution of the database statement causes a runtime error, indicating that the received database statement involves an injection attack.

20. The computing device of claim 17 wherein the process performed by the processor further includes:
in response to determining that an identical syntactic pattern already does not exist in the database,
determining whether the syntactic pattern of the received database statement corresponds to a syntactic pattern having an injection point previously been under an injection attack; and
in response to determining that the syntactic pattern of the received database statement does not correspond to a syntactic pattern having an injection point previously been under an injection attack, determining whether a query term of the received database statement includes at least one of a comment or reference to a system resource or execution of the database statement causes a runtime error; and in response to determining that the query term does not include at least one of a comment or reference to a system resource and execution of the database statement does not cause a runtime error, indicating that the received database statement does not involve an injection attack and storing the syntactic pattern of the received database statement as a pattern record.

* * * * *